(12) United States Patent
Puigardeu et al.

(10) Patent No.: US 8,851,594 B2
(45) Date of Patent: Oct. 7, 2014

(54) FILL REDUCTION FOR PRINTING

(75) Inventors: Sergio Puigardeu, Barcelona (ES); Luis Garcia Garcia, Les Roquetes (ES); Angel Martinez Barambio, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 12/906,110

(22) Filed: Oct. 17, 2010

(65) Prior Publication Data

US 2012/0092398 A1    Apr. 19, 2012

(51) Int. Cl.
    *B41J 2/195*    (2006.01)
    *G06K 15/02*    (2006.01)
(52) U.S. Cl.
    CPC .................. *G06K 15/1871* (2013.01)
    USPC .............................. 347/7; 358/521

(58) Field of Classification Search
    USPC ............................... 347/7; 358/521
    See application file for complete search history.

(56) References Cited

U.S. PATENT DOCUMENTS

| | | | |
|---|---|---|---|
| 5,699,172 A | 12/1997 | Hattori et al. | |
| 5,724,089 A | 3/1998 | Nagumo et al. | |
| 5,860,047 A | 1/1999 | Hernandez | |
| 7,431,419 B2 | 10/2008 | Turner et al. | |
| 7,697,149 B2 * | 4/2010 | Tanaka et al. | 358/1.13 |
| 2009/0244637 A1 | 10/2009 | Miyazaki et al. | |
| 2010/0128287 A1 * | 5/2010 | Harris et al. | 358/1.2 |

* cited by examiner

*Primary Examiner* — Uyen Chau N Le
*Assistant Examiner* — Chad Smith (57) ABSTRACT

Systems and methods of fill area reduction during printing are disclosed. An example of a method includes identifying a fill area. The method also includes generating a depletion matrix corresponding to the fill area. The depletion matrix identifies which of the plurality of print heads to deactivate. The method also includes selectively adjusting output from the plurality of print heads based on the depletion matrix in order to reduce fill area during printing.

20 Claims, 5 Drawing Sheets

FILL REDUCTION FOR PRINTING

BACKGROUND

Color printers have become increasingly more commonplace with advances in printing technologies. High-quality, inexpensive color printers are readily commercially available in a wide variety of sizes ranging from portable and desktop inkjet printers for use at home or at the office, to commercial-grade large format printers.

Traditionally, printers were used primarily for printing text documents. Today, however, color printers are readily commercially available and are routinely used to print complex technical images, such as computer-aided design (CAD), mechanical CAD (MCAD), and geographic information system (GIS) images. The printed image is typically made from multiple passes of print heads which deposit ink onto a substrate.

Printer users are always looking for ways to reduce the cost per copy (also referred to as "C×C"—pronounced C-by-C), particularly in the large format market. Decisions to purchase a particular printer, determine who in an organization can use the printer, and how often, are guided by C×C considerations.

Some printers have an "economical" or "draft" print mode that uses up to about 40% less ink than the high quality print mode. The draft print mode uses less color saturation and represents a trade-off between image quality and ink consumption. But even draft print mode still takes time to print large fill areas. Other printers use more chromatic dye in the inks, enabling less ink to be used to provide comparable color saturation. But these inks can be expensive, at least partly defeating the motivation for reducing ink consumption.

DETAILED DESCRIPTION

Printing systems and methods for fill reduction during printing are disclosed. An example of a printing system may include a plurality of print heads configured to deposit ink on a substrate. A controller is operatively associated with the plurality of print heads. The controller is configured to adjust output from the plurality of print heads based on a depletion matrix in order to reduce fill during printing.

In an embodiment, the controller is configured to identify a fill area. The controller is further configured to generate a depletion matrix corresponding to the fill area, the depletion matrix identifying which of the plurality of print heads to deactivate. The controller is further configured to selectively adjust output by selectively turning off the plurality of print heads in the fill area. The controller may be further configured to print only an edge of the fill area. The controller may also be further configured to apply the depletion matrix to all color channels. Accordingly, the systems and methods disclosed herein may reduce C×C while still allowing the user to control overall print quality.

Figure 1:
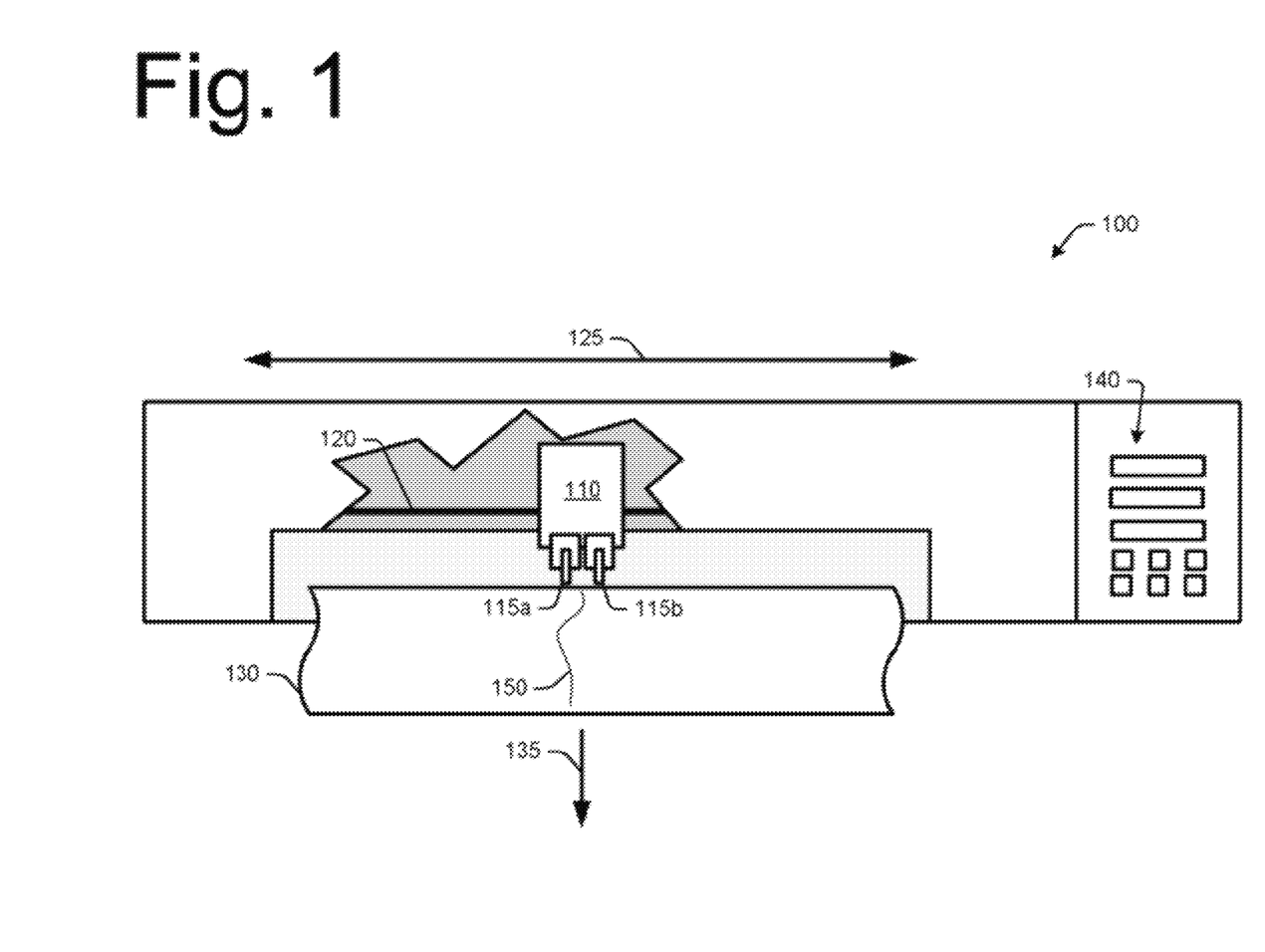
FIG. 1 is a high-level illustration of an exemplary printing system which may be implemented for fill reduction during printing.

FIG. 1 is a high-level illustration of an exemplary printing system which may be implemented for fill reduction during printing. Exemplary printing system or printer 100 may be a large format inkjet printer or other suitable printer now known or later developed which implements the teachings herein.

Printer 100 may include one or more print heads provided on a carriage 110 to move along rail 120 in at least two directions (e.g., the directions illustrated by arrow 125) as a substrate (e.g., paper 130) is fed through the printer (e.g., in the directions illustrated by arrow 135). Of course, print heads may move in any desired direction depending on the construction of the printer 100.

Print heads 115a and 115b are visible in FIG. 1 for purposes of illustration. Typically, at least four, and often more than four print heads, are used for printing color images. Printers printing with six and more colors are also commercially available. Each of the print heads (or a group of print heads) delivers a primary color such as Cyan, Magenta, Yellow, and Black (according to the CMYK color scheme), to form the colored image. The print heads may be mounted on the carriage reciprocating relative to the substrate (as shown in FIG. 1), or the print heads may be static with the substrate being transported in two orthogonal directions.

A controller may be provided to control operations. Although not visible in FIG. 1, controller may reside on the carriage 110 or behind an external control panel 140. The specific placement of the controller is not important. The controller is implemented on a circuit board (e.g., an application specific integrated circuit or "ASIC") including various functionality, such as, but not limited to, computer-readable storage and a processor configured to execute program code (e.g., firmware or software) configured to control various electronics and hardware associated with the printer 100. Optionally, the controller may be operatively associated with the external control panel 140 for input/output by a user. The controller may also be operatively associated with an external device (not shown), such as a computer or other electronic device (e.g., a mobile device) for input/output by the device.

The controller may be operatively associated with a driving mechanism (not shown) to move the carriage 110 along the rail 120 in the directions illustrated by arrow 125, and a feed mechanism (not shown) to move the paper adjacent the print heads on carriage 110 in the directions illustrated by arrow 135. The controller may also be operatively associated with one or more inkjet cartridges fluidically connected to the print heads to control the flow of ink through the print heads for transfer onto a substrate (e.g., as illustrated in FIG. 1 by line 150 on paper 130). In an exemplary embodiment, the controller delivers a voltage to the print heads to cause the print heads to deliver a volume of ink. The amount and timing of ink being delivered can be controlled based on the voltage applied to the print head by the controller. Other suitable means for controlling the delivery of ink are also contemplated.

Before continuing, it is noted that the construction and operation of printing systems are well understood in the computer and printer arts, and can readily be modified by those having ordinary skill in the art, after becoming familiar with the teachings herein, to implement the described functions. Therefore further detailed description of the printer itself is not necessary for a full understanding of the systems and methods described herein. It is also noted that the embodiments for controlling ink deposition during printing are not limited to any particular type or configuration of printer. For example, the systems and methods described herein may be used with printers in which the carriage moves the print heads relative to the substrate, printers in which the substrate moves relative to the print heads, and a combination thereof wherein both the print heads and the substrate move relative to one another.

In any event, a printer 100 includes a mechanism for transporting a substrate on which the image is to be made, and one or more print heads are located in a position relative to the substrate that enables depositing ink on the substrate. The print heads may be static or have a freedom of relative movement with respect to the substrate. The substrate may be a rigid or flexible substrate and the printer 100 may be adapted for printing images on various types of substrates.

The printer 100 may be used in one of a plurality of different print modes. In a draft mode, printing in fill areas are reduced or altogether eliminated. For example, only edges of fill areas are printed, or fill areas are printed using less ink (e.g., in a draft mode where 10%, 20%, etc. of the ink is used instead of 100% for a normal quality print mode). Accordingly, the draft mode reduces ink consumption. Although the image quality is degraded, this draft mode is typically used to determine if the plot layout and/or size are correct, which does not necessitate fill area to be completely printed. For purposes of illustration, ink consumption can be reduced by up to about 60% if 20% of the image is fill areas, by utilizing the techniques described herein, when compared to a standard draft mode for printed images.

Figure 2:
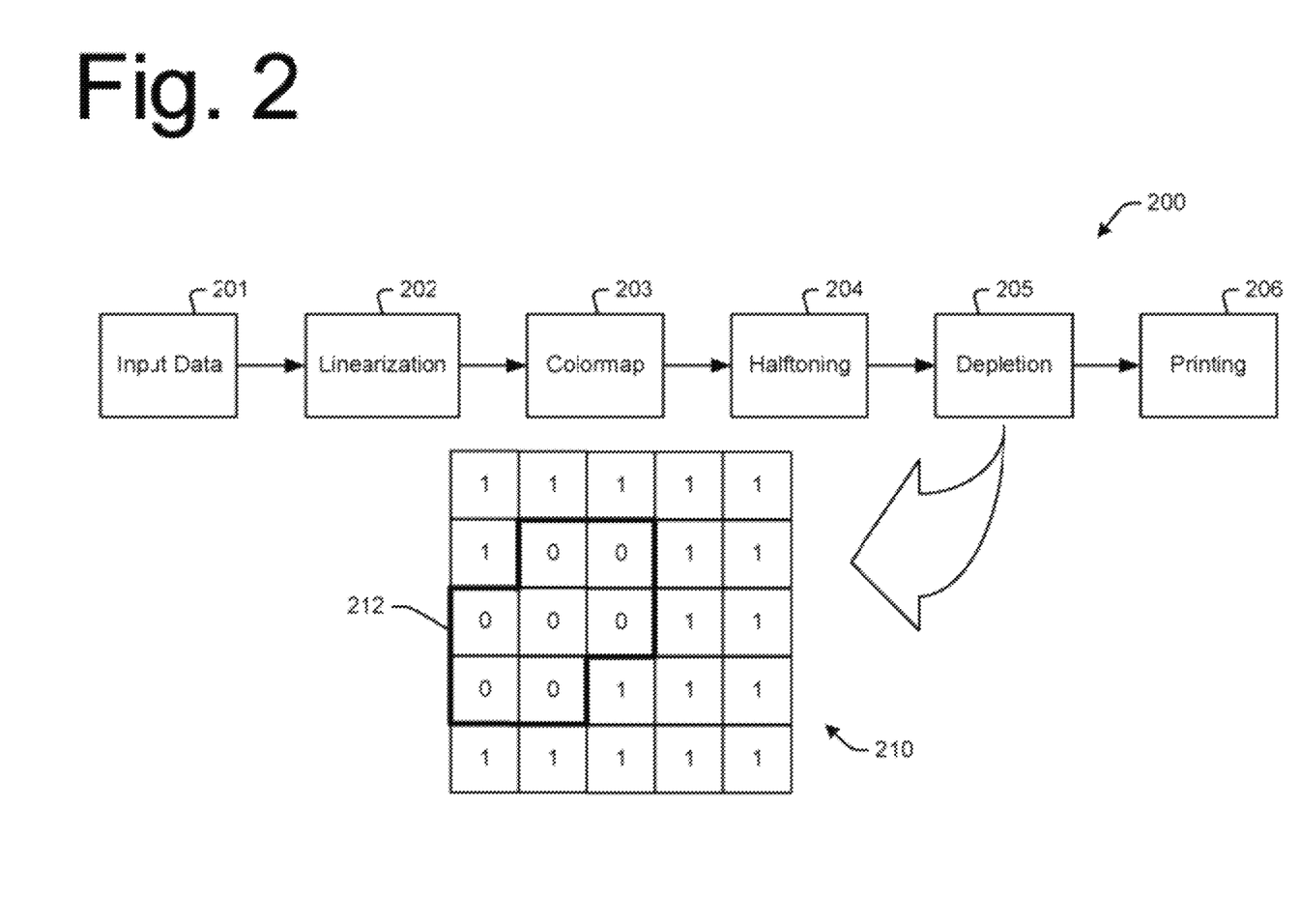
FIG. 2 shows a printing pipeline with an example of a depletion matrix that may be generated for fill reduction during printing.

FIG. 2 shows a printing pipeline 200 with an example of a depletion matrix 210 that may be generated. The printing pipeline 200 is implemented by the printer controller, and is capable of detecting fill areas regardless of the density and color ink used. The depletion matrix 210 specifies which pixels are not to be printed within the fill area.

In the example printing pipeline 200 shown in FIG. 2, data for printing the image is input to the printer at block 201. Next, the image is linearized at block 202, and a colormap is formed in block 203. Halftoning is applied at block 204, and the image is then ready for depletion at block 205. During depletion, the depletion matrix 210 may be generated. The depletion matrix 210 includes a number of pixels or groups of pixels that are to be printed. The depletion matrix 210 also shows fill areas 212 wherein ink reduction may be applied. The printing pipeline 200 then continues at block 206 to print the image.

It is noted that the example depletion matrix 210 shown in FIG. 2 is high-level for purposes of illustration only. The actual depletion matrix is much more complicated than can be shown in the drawings. That is, the example depletion matrix 210 is shown having pixel addresses in a 5×5 matrix. An actual depletion matrix would have pixel addresses numbering in the hundreds or thousands or even more. It can be seen, however, in the example depletion matrix 210 that many of the pixels represented by 1 in the depletion matrix are printed. However, the pixels represented by 0 within the fill area 212 are either printed with less ink, according to a cross-hatch or other designator pattern, or not printed at all.

The printing pipeline may be iteratively applied for each one of the colorant channels (e.g., each of the primary colors C, M, Y, and K, in the CMYK color scheme) to detect fill areas of any color. Alternatively, the printing process may be applied only to specific colors. Such an embodiment may be implemented, for example, when a particular primary ink color is low.

The depletion matrix 210 may be implemented in any of a wide variety of different configurations. In an embodiment, the depletion matrix 210 may specify that a reduced number of pixels are printed within the fill area. For example, the entire image may be printed in so-called "normal" print quality except for fill areas 212 identified by the depletion matrix 210. These fill areas 212 may be printed in a draft mode, wherein a reduced number of pixels are printed within the fill area 212. Alternatively, the fill areas 212 may be printed using cross-hatching or with some other designator pattern. In another embodiment, the depletion matrix may specify that no pixels at all are to be printed within the fill area.

The depletion matrix 210 may also specify different size edges or borders to identify the boundary (illustrated by the darkened lines) of the fill area 212. For example, thicker or thinner edges may be specified by the user. The edges may be printed in normal print quality, e.g., in the same color as specified for the fill area 212 to provide an acceptable quality edge. Alternatively, the edges may be printed in black or other contrasting color so that the edges stand out.

In an embodiment, the printer may be configured to switch between print modes including at least a normal quality print mode (higher-quality, such as a higher dots-per-inch or "dpi") and a draft mode. The depletion matrix 210 identifies which of the plurality of print heads to deactivate regardless of print mode. That is, the depletion matrix 210 may be utilized in any of the different print modes, and is not limited to use only in draft mode.

Figure 3:
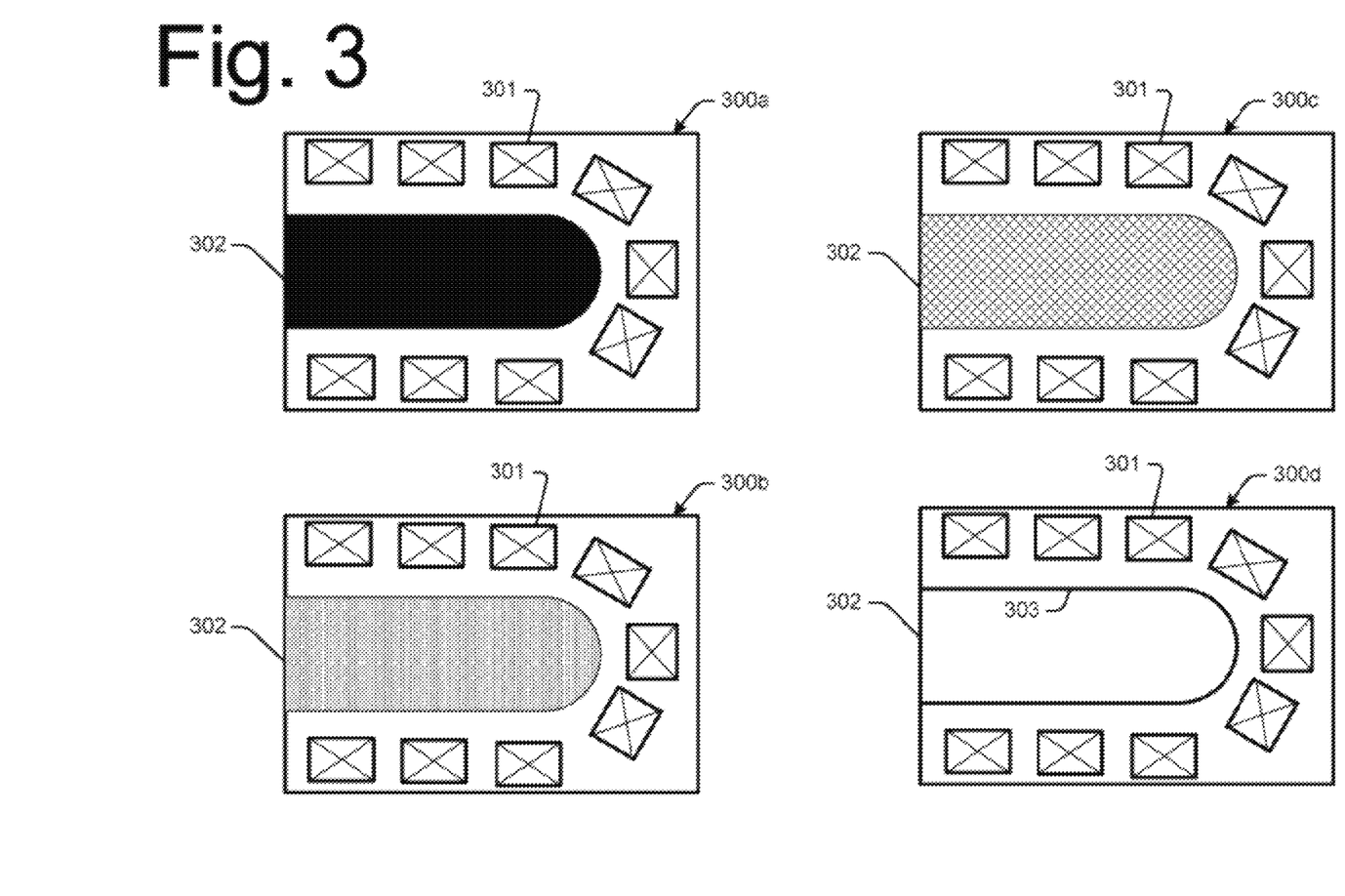
FIG. 3 shows examples of images printed according to different depletion matrixes for fill reduction during printing.

FIG. 3 shows examples of images 300a-d printed according to different depletion matrixes. The example images 300a-d are high-level architectural or engineering drawings, which have been simplified for purposes of the drawings, showing the layout of a housing neighborhood. The image includes a number of houses 301 located at the end of a street 302.

The image 300a is shown as it may be printed using a normal print mode. That is, the street 302 is a fill area that is printed entirely in black. In order to reduce ink consumption, a depletion matrix may be generated identifying the street 302 as a fill area. The image 300b is shown as it may be printed using a depletion matrix specifying a draft mode only within predetermined fill areas. That is, the draft mode prints a reduced number of pixels (e.g., 10%, 20%, etc.) giving the fill area a "grayed" appearance. Of course other methods of reducing ink deposition within the fill area 302 may also be used. The image 300c, for example, shows a cross-hatch pattern in the fill area 302. The image 300d is printed using a depletion matrix specifying only a border 303 for the fill area 302, and no pixels are printed within the border 303. The border 303 may be printed in normal print quality and may be any suitable thickness and/or color.

Figure 4:
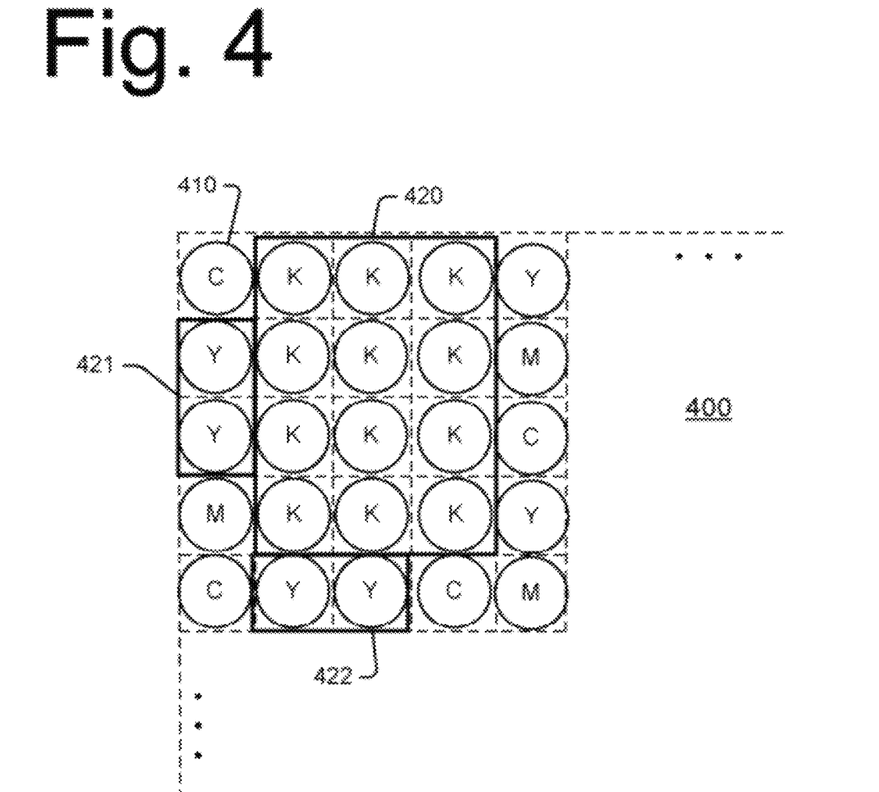
FIG. 4 illustrates an example process for identifying fill areas.

FIG. 4 illustrates an example process for identifying fill areas. For purposes of illustration, the image 400 has been simplified to show only a small portion of the pixels in the overall image. An actual image may include hundreds or thousands or even more pixels, and would complicate the drawings. In this embodiment, the image 400 is analyzed for groups of pixels. The analysis may determine if adjacent pixels are the same, or substantially the same color. The analysis may continue to identify pixels as belonging to a fill area until a predetermined number of adjacent pixels (e.g., 1, 5, 10, etc.) are no longer the same or substantially the same color as pixels in the group. The analysis may be iterative to identify more than one group of pixels in the image, and/or for more than one color space. That is, multiple separate groups may indicate more than one fill area.

In the example shown in FIG. 4, the pixels in image 400 are represented by circles 410. The letters C, Y, M, K represent different color pixels (e.g., cyan, yellow, magenta, and black, according to the CYMK color scheme). In this example, three groups of pixels are identified, as represented by blocks 420, 421, and 422. However, the pixel groups represented by blocks 421 and 422 do not satisfy the threshold to be considered a fill area. For example, blocks 421 and 422 do not contain enough pixels and may therefore represent a line or simply a fill area that does not need to be adjusted according to the ink reduction techniques described herein. However, the group of pixels represented by block 420 (e.g., corresponding to the street 302 shown in FIG. 3) does satisfy the threshold and therefore may be used for fill reduction during printing.

It is noted that the analysis may search a suitable distance (number of pixels) in more than one dimension, such as in both the X and Y dimensions, so that the analysis does not mistakenly identify lines (e.g., architectural lines in an architectural drawing) as a fill area and eliminate or reduce the quality of those lines in the printed image.

It is noted that other criteria in addition to, or instead of color may also be used to identify groups. For example, different hues, saturation, and so forth may be used to identify groups which define a fill area.

After identifying fill areas, the analysis may continue by comparing the fill areas to one or more threshold. For example, the threshold may be color based and/or size based. Other thresholds may also be applied. The thresholds may be specified by the manufacturer or the user, and may be dynamic. For example, the thresholds may change based on the size paper the image is being printed on. Or for example, the thresholds may change based on the amount of ink that remains, the number of pages being printed in a particular print job, user preferences (e.g., desired C×C), etc. Fill areas which meet the threshold are then selected for application of the depletion matrix.

Figure 5:
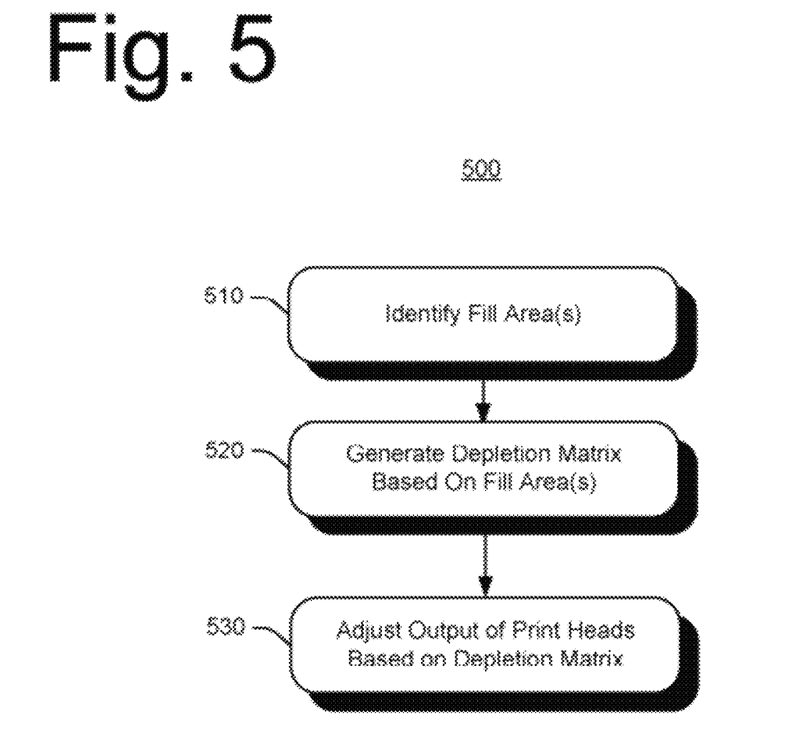
FIG. 5 is a flowchart illustrating exemplary operations which may be implemented for fill reduction during printing.

FIG. 5 is a flowchart illustrating exemplary operations which may be implemented to reduce fill area during printing. Operations 500 may be embodied as logic instructions on one or more computer-readable medium. When executed on a processor, the logic instructions cause a general purpose computing device to be programmed as a special-purpose machine that implements the described operations. The program code may be implemented as firmware, software, and/or in hardware. In an exemplary implementation, the components and connections depicted in the figures may be used.

In operation 510 a fill area is identified. The fill area may be selected using any suitable criteria. For example, a threshold corresponding to a predetermined print area may be used, wherein print areas meeting the threshold are identified for reducing fill area during printing. The threshold may be user-selectable or predetermined (e.g., set by the manufacturer). For example, the user may select different size fill areas based on desired C×C or on a project-by-project basis.

In operation 520, a depletion matrix is generated corresponding to the fill area. The depletion matrix identifies which of the plurality of print heads to deactivate. The depletion matrix may also identify whether the print heads are to be fully deactivated, or partially deactivated within the fill area boundary.

In operation 530, output from the plurality of print heads is adjusted based on the depletion matrix in order to reduce fill area during printing. For example, the print heads may be fully deactivated, or partially deactivated within the fill area boundary. It is noted that one or more print head may be deactivated, such as the print head for a particular color.

The operations shown and described herein are provided to illustrate exemplary implementations of controlling ink deposition during printing. It is noted that the operations are not limited to the ordering shown. Still other operations may also be implemented.

Operations may also include identifying the fill area is regardless of the ink color and ink density. Operations may also include printing an edge of the fill area and not printing within the edge of the fill area. The edge may correspond to a boundary of the fill area, and may be any suitable width. Operations may also include applying the depletion matrix to all color channels, or to only particular color channels. Operations may also include printing all of an image in a normal quality print mode except for a portion within the fill area, which is printed in a draft mode or not printed at all.

It is noted that the exemplary embodiments shown and described are provided for purposes of illustration and are not intended to be limiting. Still other embodiments are also contemplated for reducing fill area during printing.

The invention claimed is:

1. A method comprising:
    identifying by a controller a fill area by analyzing adjacent pixels in a group until a predetermined number of the adjacent pixels are no longer the same color as pixels in the group and comparing the group to a threshold;
    generating a depletion matrix corresponding to the fill area, the depletion matrix identifying which of a plurality of print heads to deactivate; and
    selectively adjusting output from the plurality of print heads based on the depletion matrix in order to reduce fill area during printing.

2. The method of claim 1, wherein identifying the fill area is regardless of ink color and ink density.

3. The method of claim 1, further comprising applying the depletion matrix to all color channels.

4. The method of claim 1, further comprising printing an edge of the area.

5. The method of claim 4, wherein printing the edge of the fill area demarcates a boundary of the fill area.

6. The method of claim 1, further comprising printing a portion within the fill area using a cross-hatch.

7. The method of claim 1, further comprising printing all of an image in a normal quality print mode except for a portion within the fill area.

8. The method of claim 7, further comprising printing the portion within the fill area printed in a draft mode.

9. The method of claim 7, further comprising not printing any pixels within the fill area.

10. A printing system comprising:
    a plurality of print heads configured to deposit ink on a substrate; and
    a controller operatively associated with the plurality of print heads, the controller configured to adjust output from the plurality of print heads based on at least one depletion matrix in order to reduce fill area during printing, the fill area identified by analyzing adjacent pixels in a group until a predetermined number of the adjacent pixels are no longer the same color as pixels in the group and comparing the group to a threshold.

11. The printing system of claim 10, wherein the controller is further configured to identify a fill area.

12. The printing system of claim 10, wherein the controller is further configured to generate the at least one depletion matrix corresponding to the fill area, the at least one depletion matrix identifying which of the plurality of print heads to deactivate.

13. The printing system of claim 10, wherein the controller is further configured selectively turn off the plurality of print heads in the fill area.

14. The printing system of claim 10, wherein the controller is further configured to print only an edge of the fill area.

15. The printing system of claim 10, wherein the controller is further configured to apply a depletion matrix for each of a plurality of color channels.

16. A control system for a printer comprising:
a controller operatively associated with a plurality of print heads configured to deposit ink on a substrate, the controller including program code stored on a computer-readable medium and executable by a processor to:
selectively adjust output from the plurality of print heads based on a depletion matrix in order to reduce fill area during printing, the fill area identified by analyzing adjacent pixels in a group until a predetermined number of the adjacent pixels are no longer the same color as pixels in the group and comparing the group to a threshold.

17. The control system of claim 16, wherein the program code is further executable by the processor to:
identify a fill area; and
generate at least one depletion matrix corresponding to the fill area, the at least one depletion matrix identifying which of the plurality of print heads to deactivate.

18. The control system of claim 16, wherein the program code is further executable by the processor to change the electrical output to the plurality of print heads based on the depletion matrix.

19. The control system of claim 16, wherein the program code is further executable by the processor to print only an edge of the fill area and not print any pixels within the edge of the fill area according to the depletion matrix to reduce ink consumption.

20. The control system of claim 16, wherein the program code is further executable by the processor to:
switch between print modes including at least a normal quality print mode and a draft mode; and
wherein the depletion matrix identifies which of the plurality of print heads to deactivate regardless of print mode.

* * * * *

UNITED STATES PATENT AND TRADEMARK OFFICE
CERTIFICATE OF CORRECTION

PATENT NO. : 8,851,594 B2
APPLICATION NO. : 12/906110
DATED : October 7, 2014
INVENTOR(S) : Sergio Puigardeu et al.

Page 1 of 1

It is certified that error appears in the above-identified patent and that said Letters Patent is hereby corrected as shown below:

In the Claims

In column 6, line 35, in Claim 4, delete "area." and insert -- fill area. --, therefor.

Signed and Sealed this
Second Day of June, 2015

Michelle K. Lee
*Director of the United States Patent and Trademark Office*